United States Patent [19]

Wu

[11] Patent Number: 5,850,210
[45] Date of Patent: Dec. 15, 1998

[54] DISPLAY POINTING DEVICE PROVIDED FOR CORRELATING DISPLAY CURSOR LOCATIONS TO PHYSICAL LOCATIONS POINTED BY THE DISPLAY POINTING DEVICE

[76] Inventor: Yongan Wu, 1622 Berkeley Way #4, Berkeley, Calif. 94703

[21] Appl. No.: 720,564

[22] Filed: Sep. 30, 1996

[51] Int. Cl.$^6$ .................................................. G09G 5/08
[52] U.S. Cl. ......................... 345/157; 345/163; 345/164
[58] Field of Search ................................. 345/157, 163, 345/164, 165, 166; 178/18, 19

[56] References Cited

U.S. PATENT DOCUMENTS

| | | | |
|---|---|---|---|
| 4,831,566 | 5/1989 | Matthews et al. | 345/157 |
| 4,977,832 | 12/1990 | Walter | 101/365 |
| 5,065,145 | 11/1991 | Purcell | 345/157 |
| 5,075,873 | 12/1991 | Seki et al. | 395/140 |
| 5,297,254 | 3/1994 | Arai et al. | 395/161 |

*Primary Examiner*—Jeffery A. Hofsass
*Assistant Examiner*—Ashok Mannava
*Attorney, Agent, or Firm*—Bo-In Lin

[57] ABSTRACT

The present invention includes computer display pointing device for controlling a display cursor. The computer display pointing device includes a physical location pointer for pointing to physical locations. The computer display pointing device further includes a device for generating physical location signals useful for recording and correlating cursor locations corresponding to physical locations pointed by the physical location pointer. In a preferred embodiment, the physical location pointer is an arrow-shaped pointer for pointing to the physical locations. In yet another preferred embodiment, the physical location pointer is an unfolding-and-folding arrow-shaped pointer whereby the physical location pointer may be unfolded to function in a physical location pointing mode and folded to function in a regular mode for controlling only the display cursor.

11 Claims, 9 Drawing Sheets

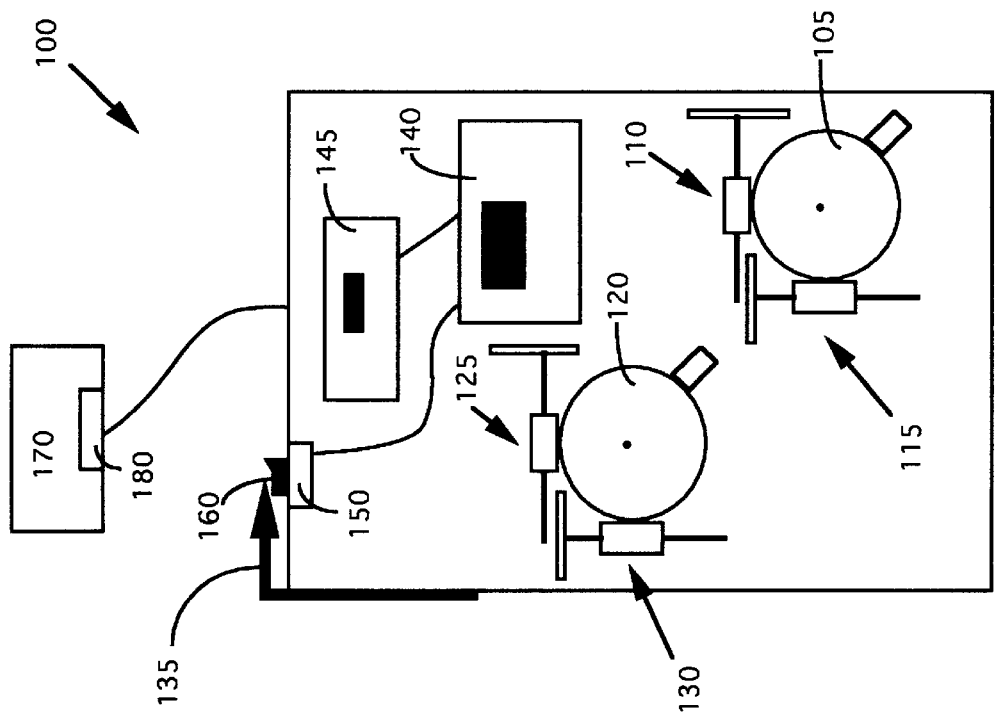
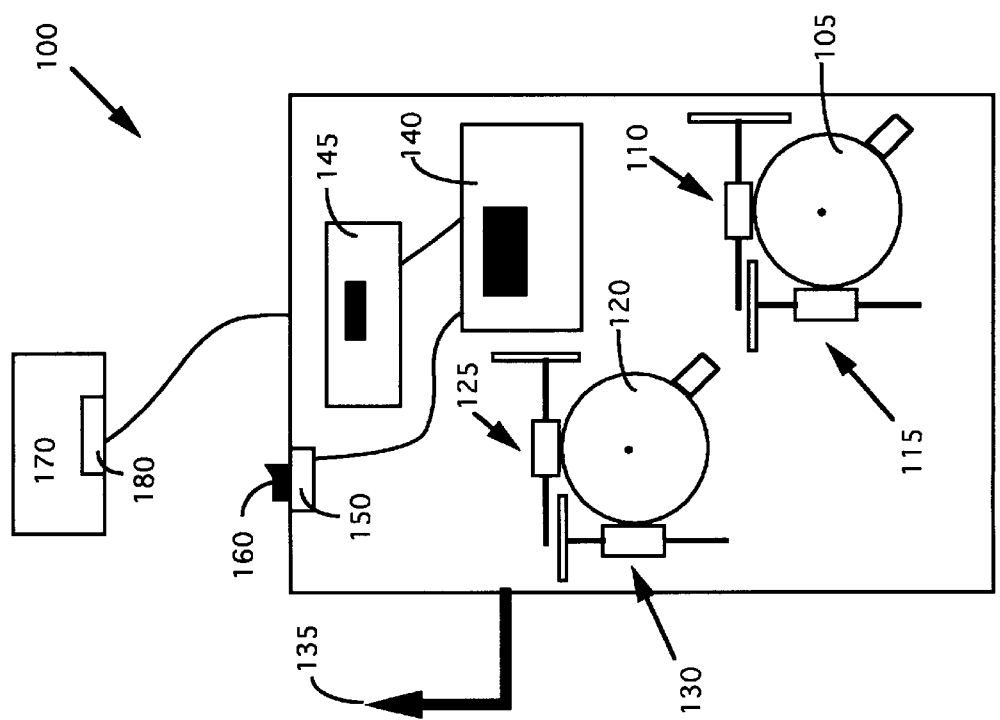
FIG. 2
FIG. 2B

DISPLAY POINTING DEVICE PROVIDED FOR CORRELATING DISPLAY CURSOR LOCATIONS TO PHYSICAL LOCATIONS POINTED BY THE DISPLAY POINTING DEVICE

BACKGROUND OF THE INVENTION

1. Field of the Invention

This invention relates generally to a pointing device for display, e.g., a computer mouse. More particularly, this invention relates to an improved display pointing device provided with a physical location pointer and correlation means for correlating movement of the physical location pointer to corresponding cursor movement controlled by the display pointing device.

2. Description of the Prior Art

Even with rapid progresses made in computer, printer and other multi-media technologies, a typewriter is still a standard office equipment in a modern office due to the occasional need to type a form. Extra space is occupied by a typewriter since it cannot be replaced due to the fact the computer and printer along cannot perform the functions carried out by a typewriter and its functions cannot be easily replaced. With an office typically equipped with a computer and printer, a more expensive and time consuming process by the use of scanner to scan a form into a computer followed by converting the graphic file into a computer recognizable "ASCII" file have to be first performed before a simple task of filling up a form can be accomplished. A simple mechanical typing process cannot be properly performed by the use of high speed computers and sophisticated high resolution printers. This is due to the difficulties that a point on a display screen, usually pointed by a cursor controlled by a computer "mouse" cannot properly be correlated to the location on a pre-printed paper, e.g., a form which is required to be filled up with relevant information in specific blanks provided in the form.

FIG. 1 shows a functional diagram of a conventional display screen pointing device, i.e., a computer mouse 10. The computer mouse 10 includes a ball 15 which rotates when moved on the surface of a "mouse pad" (not shown). Along the edges of the ball 15 is a X-direction motion sensor 20 and a Y-direction motion sensor 25. FIG. 1A shows a perspective view of a motion sensor 50 employed in the computer mouse 10, e.g., the X-direction motion sensor 20 and Y-direction motion sensor 25. Typically, a motion sensor 50 includes a light emitting source 55, a rotating wheel 60, and a light sensor 70. The rotating wheel 60 has an light blocking and penetrating edge 65 and a rotation engaging mechanism 75. The rotation engaging mechanism 75 is securely engaged to the ball 15 of the mouse 10 to rotate when the ball is rotated as the computer mouse 10 is moved. The rotation of the wheel 60 causes the light emitting from the light source 55 to either penetrate or be blocked by the light blocking and penetrating edge 65. The light sensor 70 then detecting the on and off in receiving the light emitted from the emitting source 55 as the wheel 60 is rotated resulting from the movement of the mouse 10. The on and off signal detected by the light sensor 70 is transmitted to a mouse signal processing and transmitting means 30 as the signals representing the movement of the mouse 10. The signals representing the movements of the mouse 10 sensed by the X-direction sensor 20 and Y-direction motion sensor 25 sent to the mouse signal processing and transmitting means 30 are then sent to the computer 40 to determine the distance of the mouse movement. The mouse 10 also includes a clicking means 35 for controlling the display cursor and for clicking on specific locations on the display screen for initiating and controlling the performance of various, display, editing and file processing functions. The clicking means 35 is also connected to the mouse signal processing and transmitting means 30 for transmitting the movement sensing signals and the clicking signals to the computer 40 via a signal cable to a series port or other input/output ports of a computer. The computer 40 includes a mouse driver to receive and process the signals transmitted from the mouse signal processing and transmitting means 30. As the function of the mouse 10 is to control the motion of the cursor on the display screen of the computer 40, the computer 40 is not provided with a feature to correlate the movement of the mouse 10 over specific physical locations with respect to movement of the cursor over the screen.

Another type of point and writing device is a light pen which is able to move the cursor on the screen and to generate writing characters to be entered into the locations pointed by the light pen. However, the writing of the light pen and the movement of the cursor have to be performed by pressing the tip of a light pen onto a special pressure sensitive surface connected to the computer. A light pen, however, cannot be applied to a form with blank lines or squares to be filled-in, preferably with printing characters generated from the computer, at specific locations on a regular piece of paper.

As most of the efforts are directed to the development of faster and better hardware and software to produce highly sophisticate textual and graphic output for "desk top publishing", there is a simple task which is mostly neglected and still carried out "manually" by the use of typewriter in the office performed mostly by secretaries or clerk-type of personnel. However, until all the forms are handled as electronic copy, as long as there are "hard-copy" forms, we are faced with the need to use the seemingly outdated typewriter.

Therefore, a need still exists in the art of computer design and application to develop a screen pointing device, e.g., a computer mouse, to provide a correlation between the point on the screen, pointed by a cursor controlled by the pointing device, and a location on a specific point on a pre-printed form or paper such that the text and figures shown on a screen can be precisely printed on a paper relating to existing pre-printed writings or lines.

SUMMARY OF THE PRESENT INVENTION

It is therefore an object of the present invention to provide a device structure and method of manufacture for a new display pointing device for moving the cursor controlled by the pointing device to precisely correlate with the physical locations on a pre-printed paper thus enabling those of ordinary skill in the art to overcome the aforementioned difficulties and limitations encountered in the prior art.

Specifically, it is an object of the present invention to provide a device structure and method of manufacture for a new display pointing device wherein a physical-location pointer is provided for pointing to the physical locations on a paper with pre-printed formal characters and to correlate the physical locations to the locations on the screen display for entering appropriate input through a computer input device whereby the input entered on the corresponding locations on the screen can be precisely printed on the physical locations pointed by the physical location pointer.

Another object of the present invention is to provide a device structure and method of manufacture for a new display pointing device wherein the correlation between a physical location on a pre-printed paper with a location on a display screen can be established by simple hardware and software modifications to the current standard system such that this new features of location correlation can be implemented with very small additional costs.

Another object of the present invention is to provide a device structure and method of manufacture for a new display pointing device wherein the correlation between a physical location on a pre-printed paper with a location on a display screen can be conveniently established without complicate user operations such that the forms with pre-printed blanks can be easily filled up by employing a computer and printer without requiring a scanner or additional optical or electrical devices.

Briefly, in a preferred embodiment, the present invention includes a computer display pointing device for controlling a display cursor. The computer display pointing device includes a physical location pointer for pointing to physical locations. The computer display pointing device further includes a means for generating physical location signals useful for recording and correlating cursor locations corresponding to physical locations pointed by the physical location pointer. In a preferred embodiment, the physical location pointer is an arrow-shaped pointer for pointing to the physical locations. In yet another preferred embodiment, the physical location pointer is an unfolding-and-folding arrow-shaped pointer whereby the physical location pointer may be unfolded to function in a physical location pointing mode and folded to function in a regular mode for controlling only the display cursor.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 2 is a functional diagram of a new computer mouse with a physical location pointer and two magnetic balls for correlating a physical location movement to a display location movement on the screen;

FIG. 2B is a functional diagram of the computer mouse of FIG. 2 with a physical location pointer folded and the mouse can be use as a regular mouse;

DETAILED DESCRIPTION OF THE PREFERRED EMBODIMENT

Figure 1:
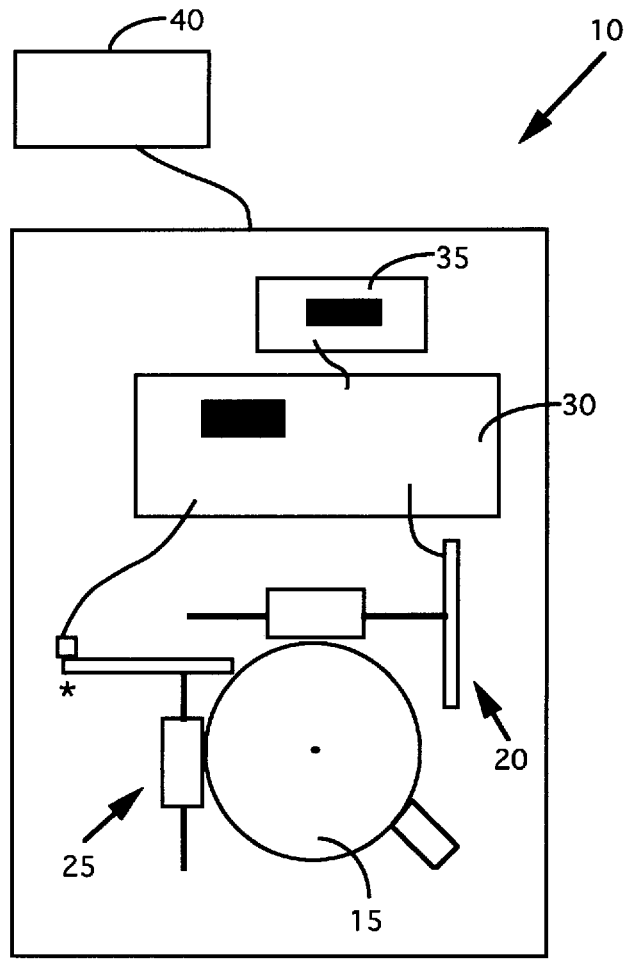
FIG. 1 is a functional diagram of a conventional computer mouse with a structure which is commonly implemented in the prior art.
Figure 1A:
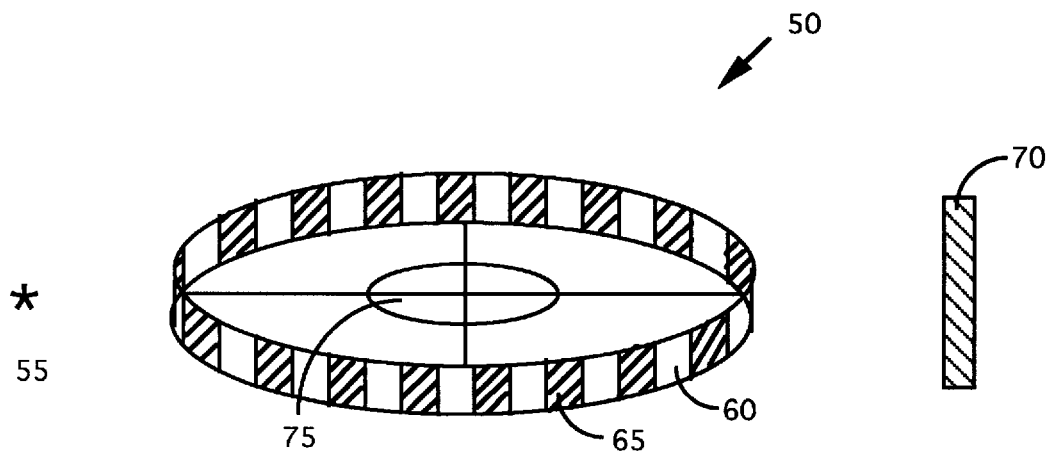
FIG. 1A is a perspective view of a motion detector employed in a conventional computer mouse.
Figure 2C:
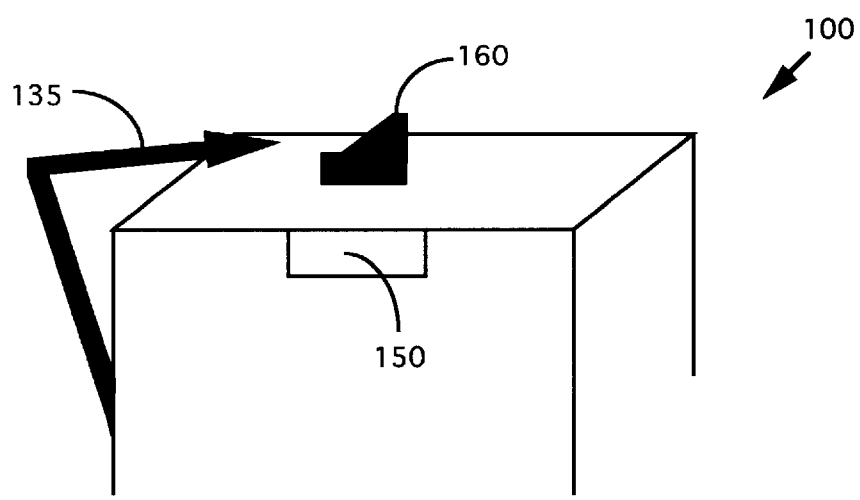
FIG. 2C is a functional diagram of a pointer dispatching sensing switch to turn on and off the pointer mode of a computer depending on the folding or extension position of the physical location pointer on the mouse of FIG. 2.

Please refer to FIG. 2 for a novel pointing device, i.e., a mouse 100 of the present invention. The pointing device 100 includes a first ball 105 with a first set of X-direction movement sensor 110 and Y-direction movement sensor 115. The pointing device 100 also includes a second ball 120 and a second set of X-direction and Y-direction movement sensors 125 and 130 respectively. The mouse 100 further is equipped with a physical location pointer 135 for pointing a specific point on a hard-copy, e.g., a form. Similar to a traditional mouse 10 as shown in FIG. 1, the mouse 100 of the present invention 100 also includes a mouse signal processing and processing means 140 and a clicking means 145. The movement sensors 110, 115, 125 and 130 are connected to the mouse signal processing means 140 to provide the signals relating to the mouse movement. Likewise, the clicking means 145 is also connected to the mouse signal processing and transmitting means 140 to provide a clicking signal when a user click motion is sensed. The mouse 100 further includes a pointer dispatching sensing means 150. The physical location pointer 135 can be folded back as that shown in FIG. 2B, or extended to a dispatched position. As shown in FIG. 2C, the pointer dispatching sensing means 150 includes a switch 160 which is turned off when the pointer 135 is folded and turned on when it is extended to its dispatched position. When pointer 135 is folded, the mouse 100 can be used as a regular mouse 10 just like the mouse of the prior art. A signal is sent to the mouse signal processing and transmitting means 140 when the pointer 135 is extended. A signal is sent to the computer 170 which includes a mouse driver 180 to switch the mouse operation mode to a "form pointing mode".

Figure 3A:
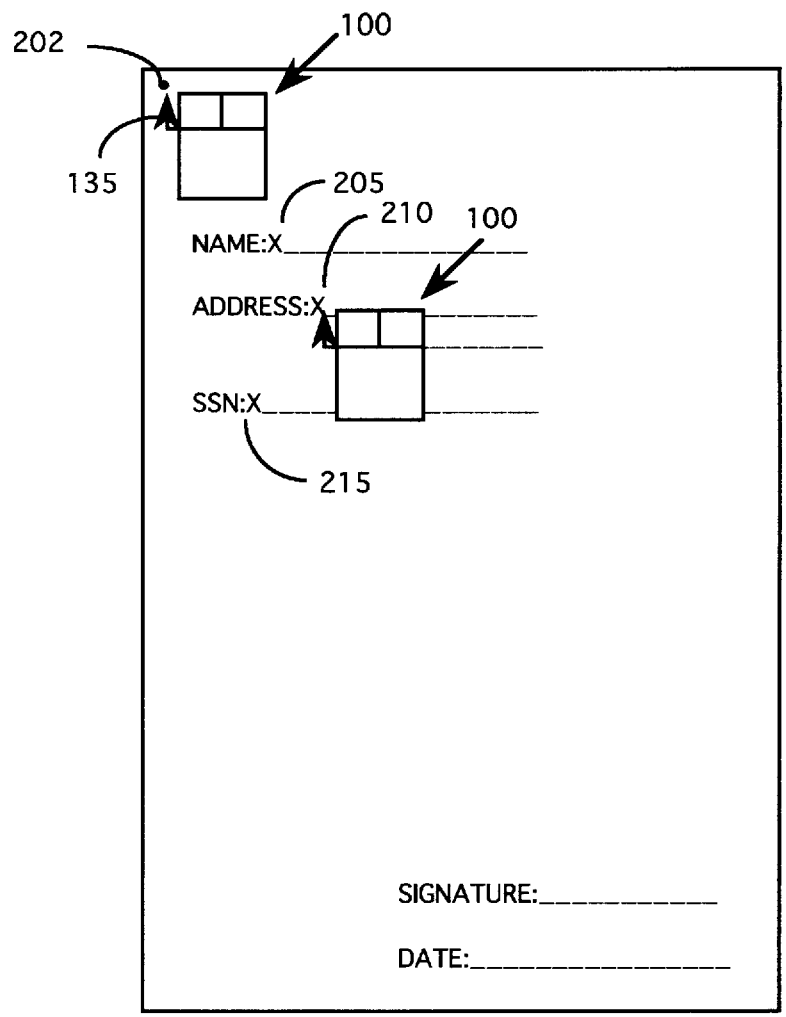
FIG. 3A is a pre-printed form 200 with name, address and social security number (SSN) to be filled up at specific locations on the form.

FIG. 3A is a pre-printed form 200 with name, address and social security number (SSN) to be filled up at specific locations on the form. A user of the mouse 100 can first click with the physical location pointer 135 pointing to the top-left corner 202 of the form. The user then drags the mouse 100 to the location 210 to type on the screen pointed by a cursor corresponding to the physical location 210 on the form. As the mouse is dragged to the location 210 from the point 202, distances of movement along X-direction and Y-direction of the first ball 105 and second ball 120 are measured as ΔX1, ΔX2 and ΔY1, ΔY2 by the movement sensors of the X-direction 105 and 125 and movement sensors along the Y-direction 110 and 130 respectively. The physical location of the new point 210 which is now pointed by the physical location pointer 135 can be processed by the mouse driver 180 as the followings:

1) When the mouse 100 is dragged from location 202 to 210 and the locations of the first and second balls are moved from $(X_1,Y_1)$, and $(X_2,Y_2)$ to $(X'_1,Y'_1)$ and $(X'_2,Y'_2)$. The movement in the X-direction for the first ball 105 and the second ball 120 are $\Delta X_1=X'_1-X_1$ and $\Delta X'_2=X'_2-X_2$ respectively, and the movement in the Y-direction for the first ball 105 and the second ball 120 are $\Delta Y_1=Y'_1-Y_1$ and $\Delta Y_2=Y'_2-Y_2$ respectively. If $\Delta X1=\Delta X2$ and $\Delta Y1=\Delta Y2$, which may happen if there is no rotation of the mouse 100 when it is dragged from point 200 to 210, then the location of the point 210 for entering an address is $\Delta X1$ and $\Delta Y1$ from the original point 202.

Figure 3C:
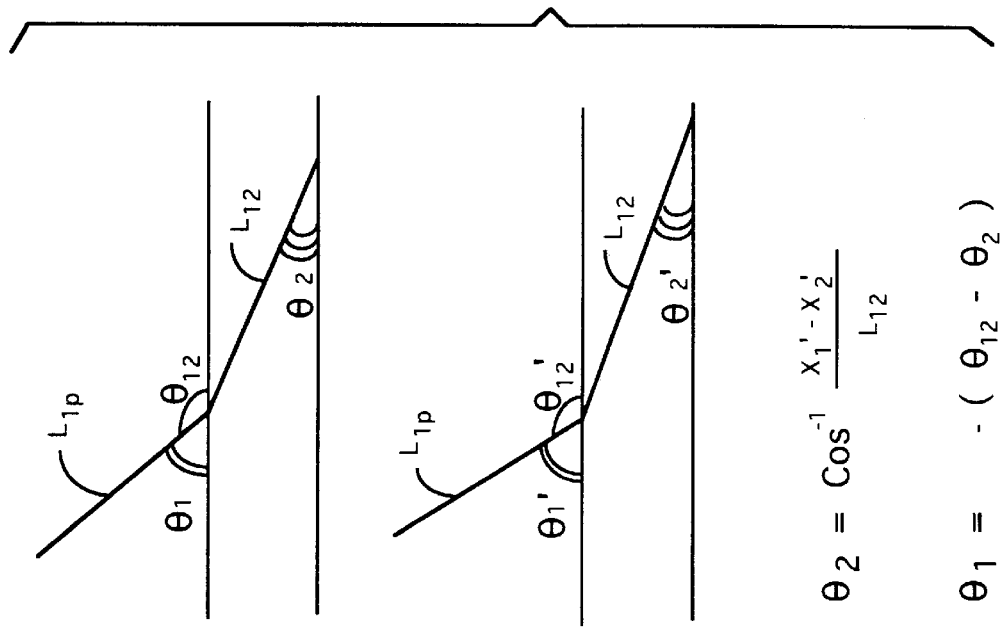
FIGS. 3B and 3C illustrate the relative positions of the balls and the physical location pointer when moved from a reference position to a new location for data entry pointed by the physical location pointer.
Figure 3B:
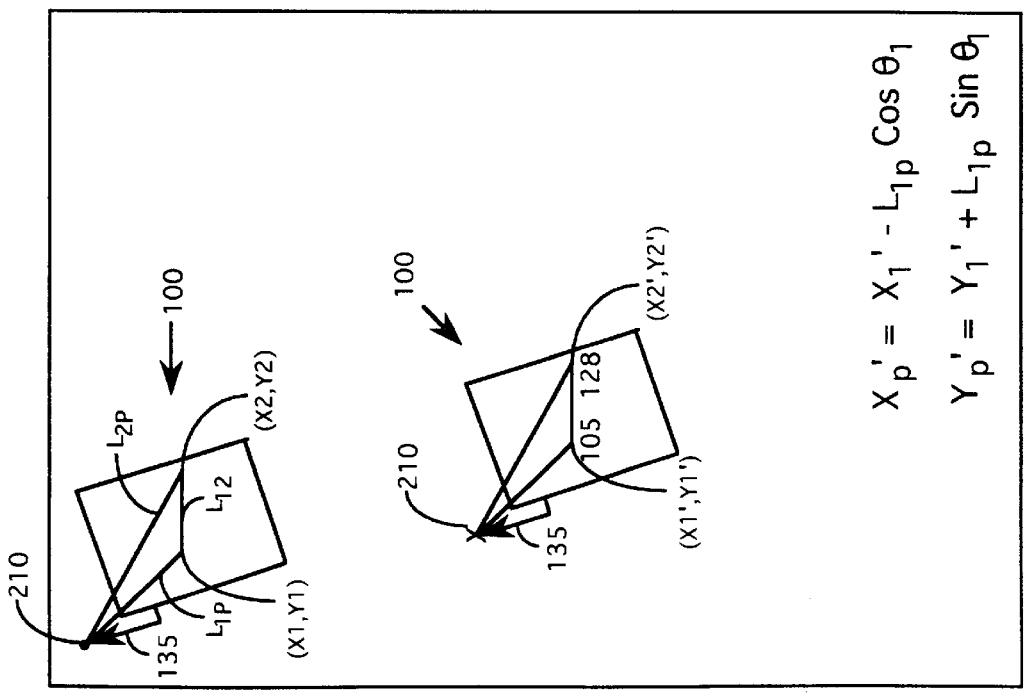

2) If a rotation occurs when the mouse 100 is dragged from the original point 200 to 210, then $\Delta X1\_\Delta X2$ and $\Delta Y1\_\Delta Y2$ and the location of the point 210 for entering an address can be obtained by a computation process performed by the mouse drive 180. The computational process is explained by referring to FIG. 3B. It is first to be noted that the relative positions between the first ball 105, the second ball 120 and the physical location pointer 135 are unchanged when the mouse 100 is dragged from location 202 to 210 and the locations of the first and second balls are moved from $(X_1,Y_1)$, and $(X_2,Y_2)$ to $(X'_1,Y'_1)$ and $(X'_2,Y'_2)$. Thus the lengths between the first and second balls, i.e., $L_{12}$, and between the second ball to the tip of the physical location pointer, i.e., $L_{1P}$, are fixed and the angle between $L_{1P}$ and $L_{12}$, i.e., $\theta_{12}$ is also fixed. Please referring to FIG. 3C, when the mouse 100 is dragged from point 202 to point 210, the mouse is rotated, and the horizontal angles of $L_{12}$ and $L_{1P}$, i.e., $\theta_2$ and $\theta_1$ are changed to $\theta'_2$ and $\theta'_1$. The angle $\theta_2$ can be determined as:

$$\theta'_2 COS^{-1}(X'_2-X'_1)/L_{12} \qquad (1)$$

and $$\theta'_1=\Pi-(\theta_{12}-\theta_2) \qquad (2)$$

and the location of (Xp', Yp') can be determined as:

$$X'p=X'_1-L_{1P}COS\ \theta'_1 \qquad (3)$$

$$Y'p=Y'_1+L_{1P}SIN\ \theta'_1 \qquad (4)$$

Once the location of $(X'_1, Y'_1)$ is determined from $(X_1, Y_1)$ by counting the movement of the mouse 100, the location of the new position of the point, i.e., point 220, pointed by the physical location pointer 135 can be determined from the above equations.

Figure 3D:
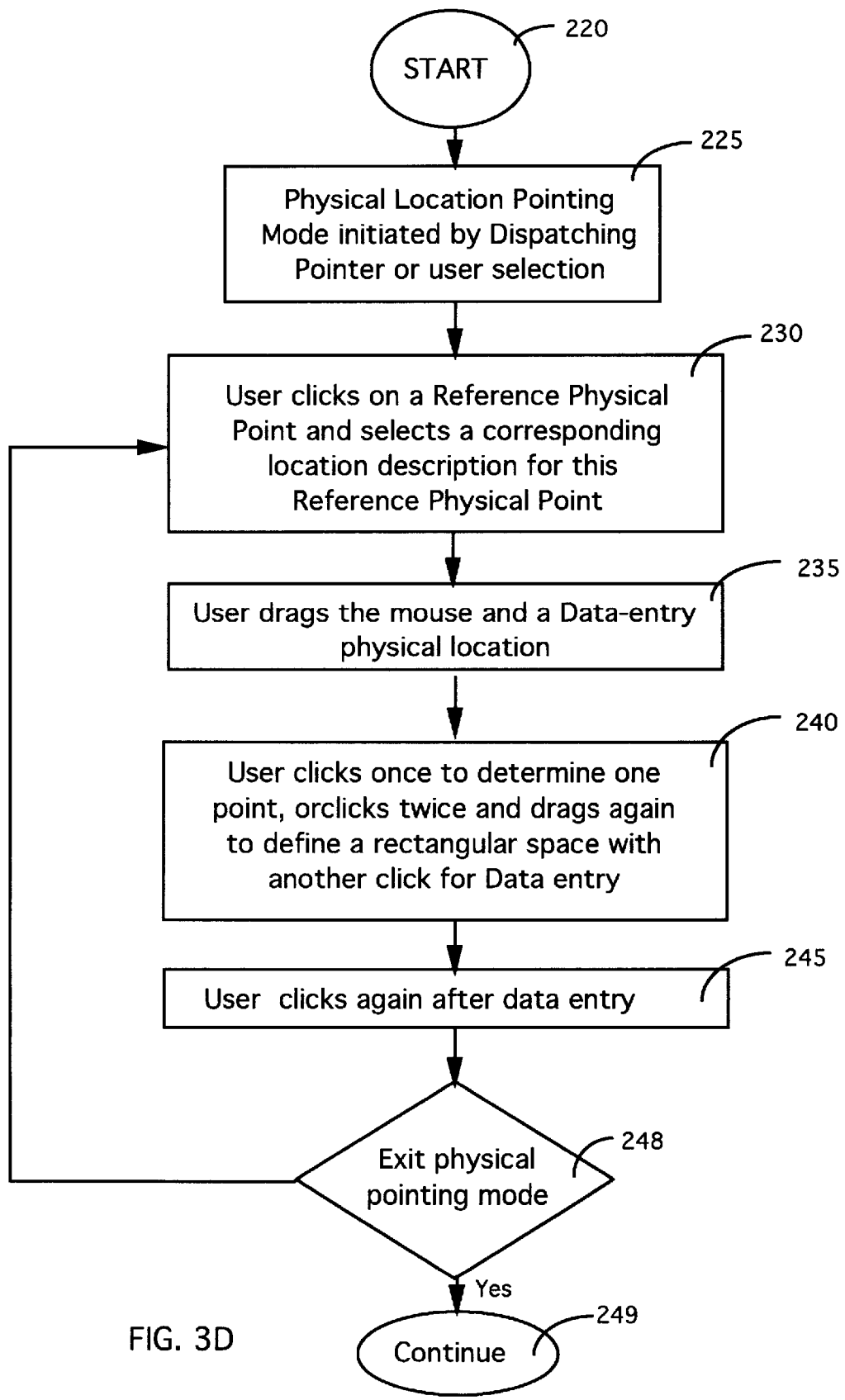
FIG. 3D is a flow-chart showing the processing steps performed by the mouse and the mouse driver under the control of a user for correlating the physical movement of the mouse on the paper with cursor location movement on a display screen for a mouse of FIG. 2.

The mouse driver 180 receives the movement signals from the mouse via the mouse signal processing and transmitting means 140 to determine a set of $\Delta X$, and $\Delta Y$ relative to a reference point when the cursor is dragged from the reference point to a new position corresponding to a new physical location which is now pointed by the physical location pointer 135 for entering data therein. FIG. 3D is a flow chart showing the processing step that the mouse 100 can be applied by using the physical location pointer 135 for pointing to the physical locations and entering data therein. The process begins (step 220) by a user selection of applying the mouse 100 in a physical location pointing mode or by initial dispatching of the physical location pointer 135 thus turning on the physical location pointing mode (step 225). The user first selects a reference physical location on the form 200 by clicking on a defined location, e.g., four corners of a standard size printing paper or a known location on the form which is previously selected and registered in the computer memory (step 230). After a user's click to define a reference point, the mouse 100 is then dragged (step 235) with the physical location pointer 135 pointing to a data entry physical location, e.g., location 210. At the data entry physical location, the user is provided with options to either click once to start enter data on that location, or clicking twice to define a space, e.g., a blank rectangle such that the user can enter data within the boundary defined by the blank rectangle (step 240). After completion of entering data at the physical location pointed by the physical location pointer 135, the user clicks the mouse 100 again (step 245). A user is then provided with the option to continue the physical location pointing mode or to exit that mode of operation (step 248). If the physical location pointing mode is to be continued, then the processing steps of 230 to 245 are repeated, otherwise, the mouse 100 is applied as a regular mouse to continue other types of computer operations (step 249). In order to carry out these functional steps, the mouse driver 180 resides on the computer must be modified to manage new and additional functions which are not being performed by a conventional mouse driver. Namely, these new functions include 1) providing a key for switching the operational mode to a physical location pointing mode, 2) registrating the cursor locations corresponding to reference physical locations; 3) computing the new physical location relative to the reference physical location by applying Equations (1) to (4) as described above when the mouse is moved; and 4) providing relevant location data for the computer to correlate the new physical location, now pointed by the physical location pointer 135, to the location for generating an output from the printer such that the data entered at the new location pointed by a display cursor as a result of mouse movement can be precisely printed on specific physical locations pointed by the physical location pointer 135.

Figure 4:
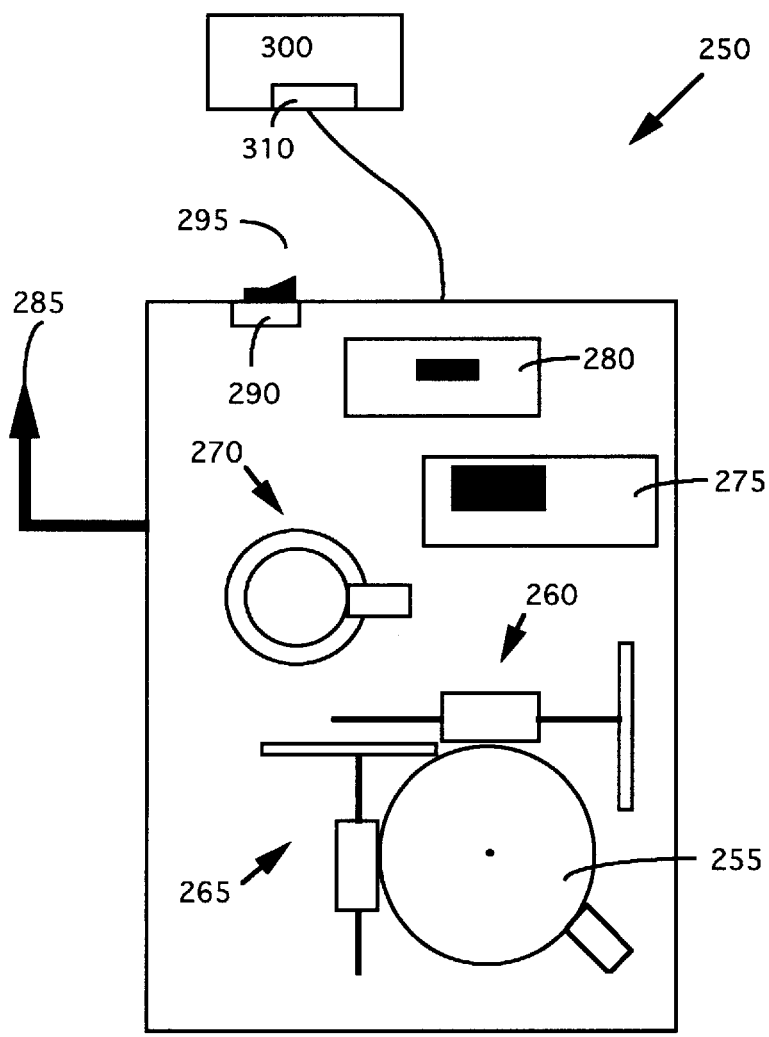
FIG. 4 is a functional diagram of an alternate new computer mouse with a physical location pointer and a rotational detection magnetic ball and a distance motion magnetic ball for correlating a physical location movement to a display location movement on the screen.

FIG. 4 shows an alternate preferred embodiment of a computer mouse 250 for controlling a display cursor the present invention. Instead of employing two balls as that shown in FIG. 2, the mouse 250 includes a first ball 255 with a X-direction movement sensor 260 and a Y-direction movement sensor 265. The mouse 250 also includes a rotational sensing device 270 which may be a second ball with an angular sensor to monitor the angular motion of the mouse 250. The mouse 250 also includes a mouse signal processing and transmitting means 275, a clicking means 280, a physical location pointer 285, a pointer dispatching sensing means 290 and a pointer dispatching switch 295. The signals representing the mouse movement and the dispatching of the physical location pointer 285 are transmitted by the mouse signal processing and transmitting means 280 to a computer 300 which includes a mouse driver 310 to process the mouse signals. When the X-direction and Y-direction movement sensor 260 and 265 detect a physical location change represented by mouse movement of $(\Delta X\hat{1}, \Delta Y\hat{1})$, and in the mean time that the rotational sensing device 270 detects a angular displacement of $\theta$, then the relative location change can be computed by the use of Equations (1) to (4) described above.

Again, the mouse driver 310 resides in the computer 300, receives the movement signals and the rotation signals to compute the relative physical location change $(\Delta X, \Delta Y)$ and register that location change to correspond to the cursor location on the display screen for a user to enters the data. The mouse driver 310 then correlates the locations where the data is entered to the corresponding physical location pointed by the physical location pointer 285 such that a print output can be generated with the data printed precisely on the physical locations.

The present invention thus discloses a computer display pointing device, e.g., a mouse 100, for controlling a display cursor. The computer display pointing device 100 includes a physical location pointer 135 for pointing to physical locations. The computer display pointing device further includes a means 140 for generating physical location signals useful for recording and correlating cursor locations to correspond to relative physical locations pointed by the physical location pointer 135. In a preferred embodiment, the physical location pointer 135 is an arrow-shaped pointer for pointing to the physical locations.

Figure 5:
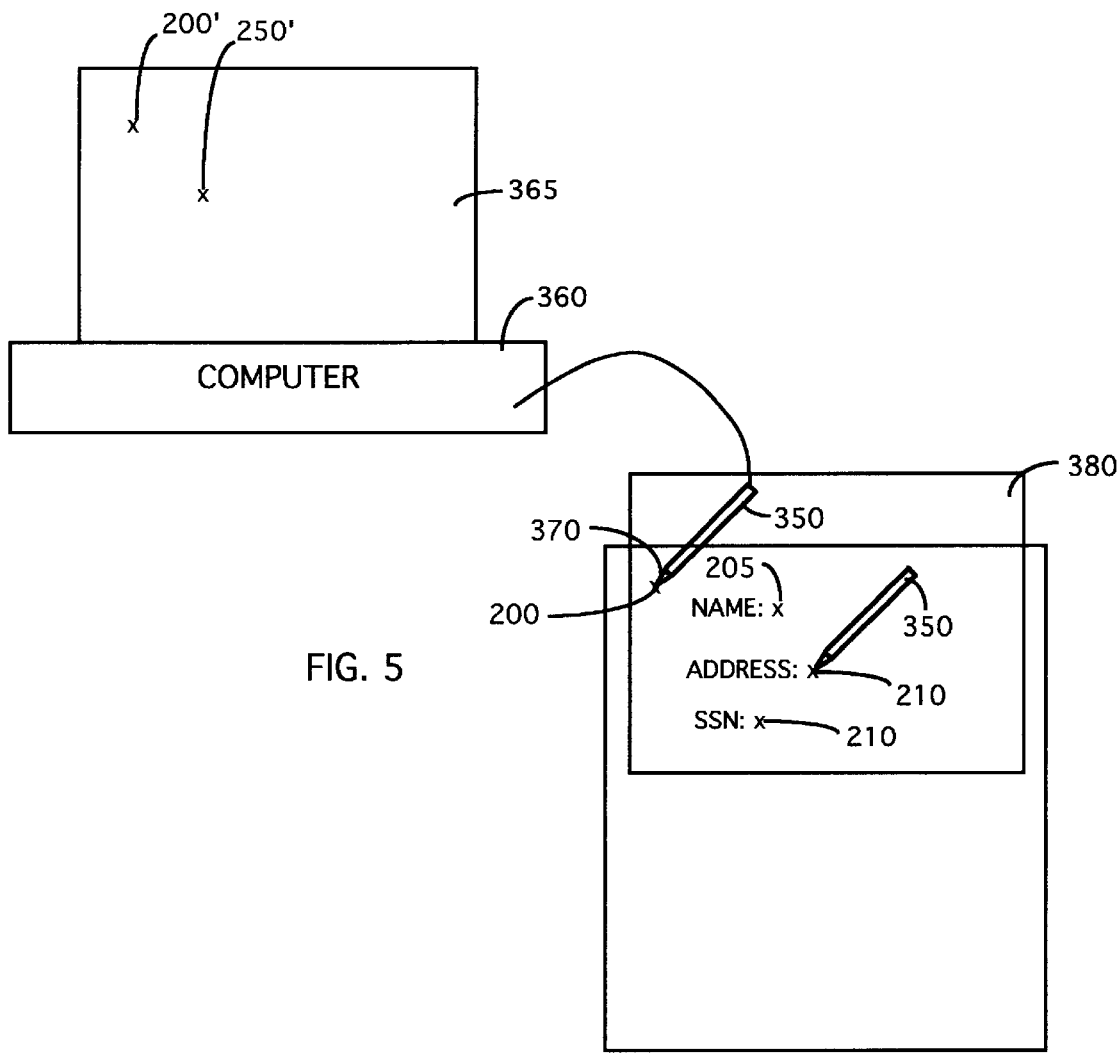
FIG. 5 is a light pen of the present invention which includes a motion sensing means to detect the physical movement of the pen on a piece of paper.

FIG. 5 shows an alternate preferred embodiment of the present invention where a light pen 350 is used as a point device for a computer 360 which has a display screen 365. A light pen movement sensing sheet 380 is employed in this preferred embodiment. The light pen movement sensing sheet 380 is a transparent sheet which is applied to cover a printed form which has a top-left reference point 200 and blank locations 205, 210 and 215 to be filled with information of name, address and social security number to be printed on the locations. By running an editing or word-processing program, the cursor is first moved to the beginning of a page on a left-top point 200' on the display screen 365. The light pen 350 is applied first to point to a point 200 on the left top corner of the form as a starting reference point Like a mouse described above, the light pen usually has a clicking means for a user to click and send a signal to the computer such that a cursor location is registered as a reference point. The light pen 250 is then moved on the surface of the movement sensing sheet 380 to another point, e.g., point 210. The movement of the light pen 350 to point 210 across the top surface of the light pen movement sensing sheet 380 also cause the display cursor on the screen 365 to move to a different point 210' corresponding to the new position, i.e., point 210, now pointed by the light pen 350.

Figure 5A:
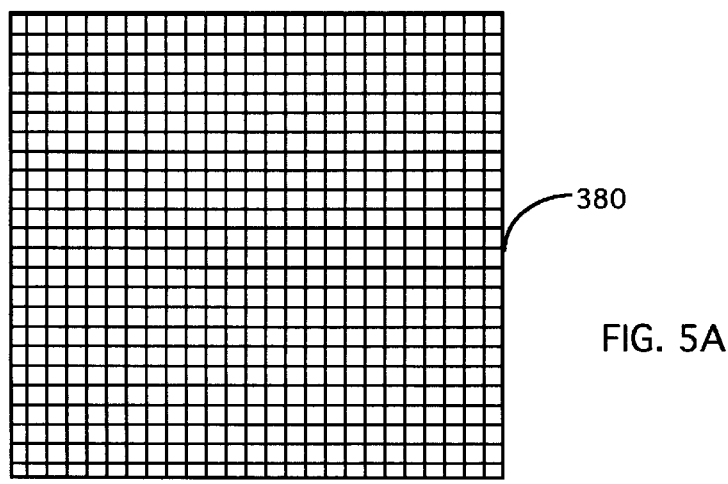
FIG. 5A is a light pen movement sensing sheet which is a transparent sheet formed with a plurality of horizontal thin lines and vertical thin lines wherein the vertical and horizontal lines may have different colors such that the light pen can distinguish when moving along the surface.

The movement of the cursor on the screen 365 is generated by the movement of the light pen 350 across the surface of the light pen movement sensing sheet 380. As shown in FIG. 5A, the light pen movement sensing sheet is a transparent sheet formed with a plurality of horizontal thin lines 385 and vertical thin lines 390 wherein the vertical and horizontal lines may have different colors such that the light pen can distinguish when moving along the surface. A preferred embodiment of the light pen movement sensing sheet 380 is formed on a transparent plastic sheet by printing a plurality of lines 385 and 390 with blue and red color respectively on the top surface of sheet 380 with a distance of approximately one millimeter between the lines. Another transparent protective layer of very thin thickness is then applied to protect the surface printed with vertical and horizontal lines. As the light pen 350 moves across these different lines 385 and 390 either vertically or horizontally, a horizontal or vertical distance signal is generated when a line is crossed by the light pen, and the signals are transmitted to the computer 360 to move the cursor accordingly based on number of times the change of alternating reflectivities occurs in either directions. Similar to the function performed by the mouse 100 as described for FIGS. 2 and 3, a user may click the light pen 350 once to start entering data on the new location pointed by the light pen 350. Alternately, a user may click the light pen 350 twice to define a rectangular space, generally display on the display screen by dotted lines, for the user to enter data in that space. Except the computations for determining the relative locations resulting from the movement of mouse by applying Equations (1) to (4), the light pen driver residing in the computer 360 performs basically similar functions as that performed by the mouse driver as that described above to correlate the physical movement of the light pen to determine the locations for generating corresponding print output.

Therefore, the present invention discloses a computer display pointing device, i.e., a light pen pointing system, for controlling a display cursor on the display screen 365. The light pen pointing system includes a physical location pointer, i.e., a light pen 350, for pointing to physical locations. The light pen pointing system also includes a means, i.e., a light pen movement sensing sheet 380, for generating physical location signals useful for recording and correlating cursor locations to correspond to relative physical locations pointed by the physical location pointer 350.

Figure 6A:
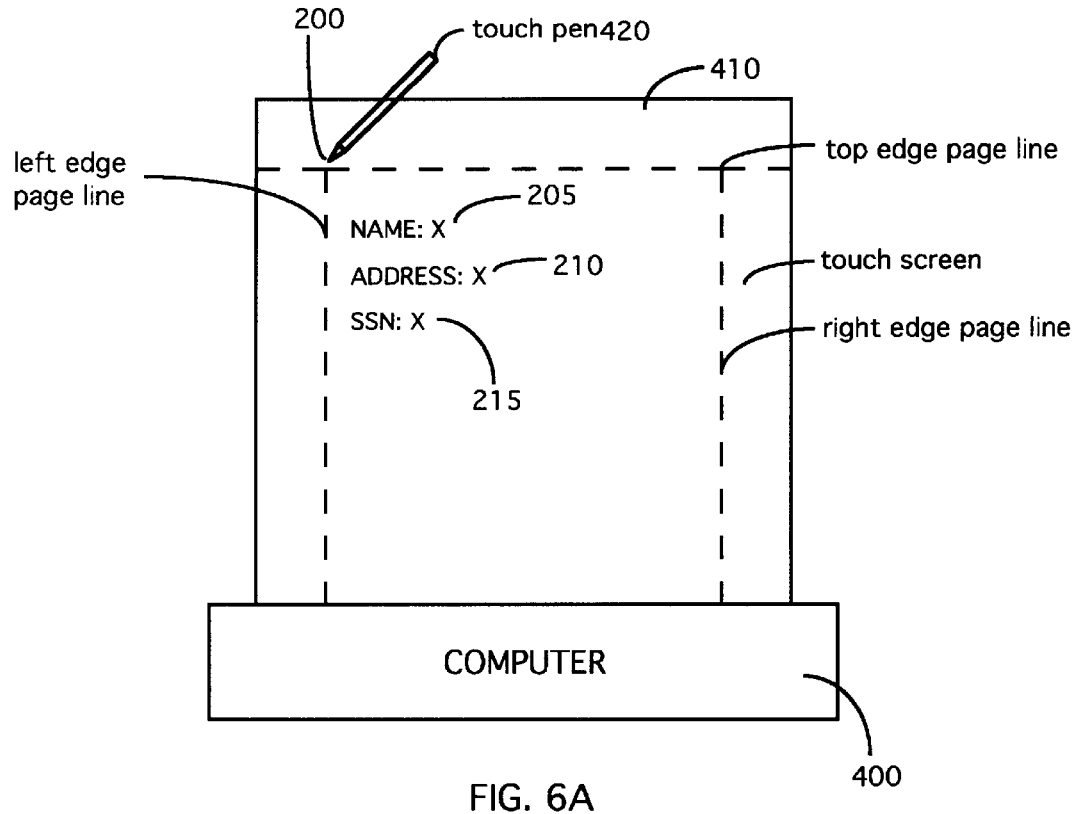
FIGS. 6A and 6B is a functional diagram for illustrating the application of a touch screen pen on a touch screen to enter data at the proper locations on the data screen for generating an output suitable for printing data on a form.
Figure 6B:
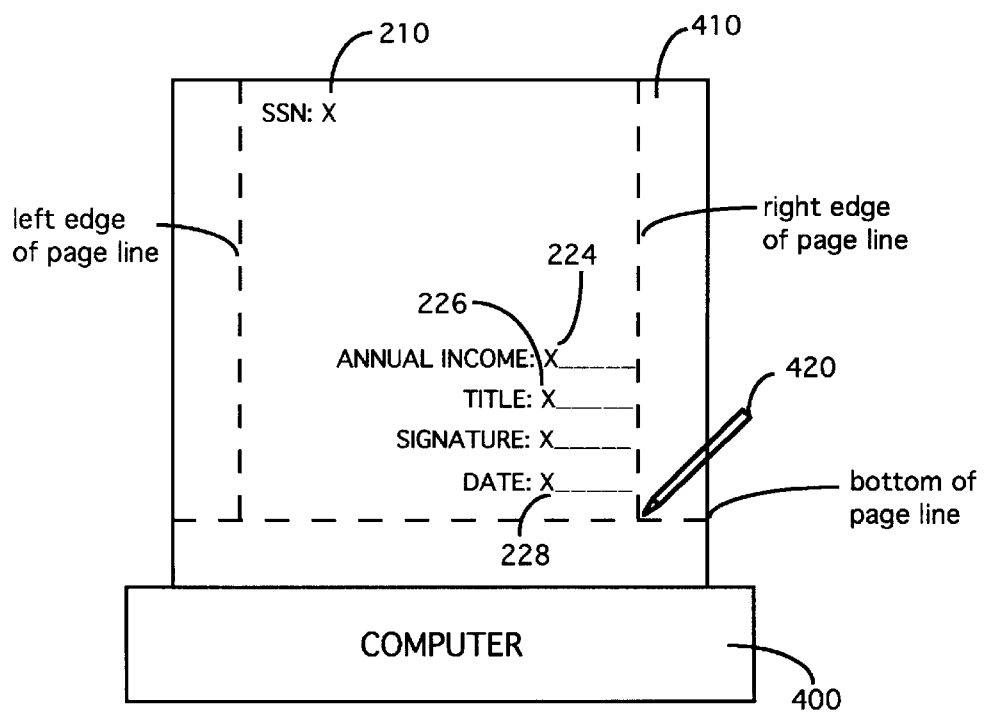

FIGS. 6A and 6B show another preferred embodiment of the present invention which includes a computer 400 having a touch screen 410 and a physical location pointer 420. The computer is first instructed to run on a "form mode" by either touching a screen manual, pressing down a key-pad on the keyboard, clicking the mouse for making a selection from a manual, or enter a command, depending on the software/hardware configurations of the computer 400 equipped with a touch screen. Once, the computer 400 is in a "form mode", dotted-lines representing a top of the page, right edge and left edge of the page are displayed as shown in FIG. 6A. A form can be placed on top of the touch screen according to the page boundary defined by the dotted-lines. The form 200 with address on point 210 to be entered on a specific location on the form is placed on the touch screen 410 and a touch pointer, or a touch screen writing pen 420 is placed on point 210 to move the cursor to that location. The data can then be entered on the point 210 by either writing on the screen or by entering the address by the use of a keyboard, again, depending on the software/hardware configurations of the computer 400. FIG. 6B shows a corresponding display for the bottom half of the page when the touch screen 410 does not have sufficient large screen to fit the entire form. The boundary lines defined on the screen 410 for the bottom half of he page is ready for the form applying the touch screen pointer or writing pen 420 to write or enter data by keyboard on specific locations on the form. Instead of showing the page boundary on the screen as dotted lines, the computer may alternately record a point, i.e., a top-left corner or a bottom-left corner, as a reference point and then process the relative positions on the screen to correlate the relative position for printing required data on specific point on a form by pointing the touch screen pen 420 on the data entry points with the form covering the touch screen 410.

Thus, the present invention further discloses a computer display pointing system provided for controlling a display cursor. The display pointing system includes a physical location pointer, a touch screen writing pen 420, for pointing to physical locations. The display pointing system further includes a means, i.e., a touch screen 410, for generating physical location signals useful for recording and correlating cursor locations to correspond to relative physical locations pointed by the physical location pointer 420.

Therefore, a device structure and method for manufacturing a new display pointing device for moving the cursor controlled by the pointing device is disclosed in this invention. It is provided to precisely correlate the display cursor with the physical locations on a pre-printed paper thus enabling those of ordinary skill in the art to overcome the difficulties and limitations encountered in the prior art.

Specifically, a new display pointing device is disclosed wherein a physical-location pointer is provided for pointing to the physical locations on a paper with pre-printed formal characters and to correlate the physical locations to the locations on the screen display for entering appropriate input through a computer input device whereby the input entered on the corresponding locations on the screen can be precisely printed on the physical locations pointed by the physical location pointer. In this invention, the correlation between a physical location on a pre-printed paper with a location on a display screen can be established by simple hardware and software modifications to the current standard system such that this new features of location correlation can be implemented with very small additional costs. Furthermore, by using this new display pointing device, the correlation between a physical location on a pre-printed paper with a location on a display screen can be conveniently established without complicate user operations such that the forms with pre-printed blanks can be easily filled up by employing a computer and printer without requiring a scanner or additional optical or electrical devices.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A computer display pointing device for controlling a display cursor comprising:

an arrow-shaped physical location pointer for pointing to physical locations;

a means for generating physical location signals useful for recording and correlating cursor locations corresponding to physical locations pointed by said physical location pointer;

said means for generating physical location signals includes a physical motion detector attached rigidly to said physical location pointer for moving together with said physical location pointer in generating said physical location signals correlating to a physical motion of said physical location pointer; and said physical motion detector includes a first rotation ball and a second rotation ball wherein said first and second rotation balls rotating with said physical motion of said physical location pointer for detecting and quantifying said physical location motion.

2. A computer display pointing device for controlling a display cursor comprising:

a physical location pointer for pointing to physical locations;

a means for generating physical location signals useful for recording and correlating cursor locations corresponding to physical locations pointed by said physical location pointer;

said physical location pointer is an unfolding-and-folding arrow-shaped pointer whereby said physical location pointer may be unfolded to function in a physical location pointing mode and folded to function in a regular mode for controlling only said display cursor.

3. The computer display pointing device of claim 2 wherein:

said means for generating physical location signals including a clicking means for clicking, when said physical location pointer pointing at designated physical locations, thus generating signals useful for recording and correlating cursor locations corresponding to said designated physical locations pointed by said physical location pointer.

4. A computer display pointing device for controlling a display cursor comprising:

a physical location pointer includes an arrow-shaped pointer for pointing to physical locations, wherein said arrow-shaped pointer is an unfolding-and-folding arrow-shaped pointer whereby said physical location pointer may be unfolded to function in a physical location pointing mode and folded to function in a regular mode for controlling only said display cursor; and a means for generating physical location signals including a clicking means for clicking, when said physical location pointer pointing at designated physical locations, thus generating signals useful for recording and correlating cursor locations corresponding to said designated physical locations pointed by said physical location pointer.

5. The computer display pointing device of claim 4 further comprising:

a computer interface means for connecting to a computer for transmitting said physical location signals and corresponding display cursor control signals thereto.

6. The computer display pointing device of claim 4 further comprising:

a movement detection means for detecting a movement of said display pointing device for generating a display pointing device movement signal and for transmitting said display point device movement signal through said computer interface means for controlling and moving said display cursor.

7. A computerized physical-location-print control system comprising:

a computer-provided for generating a display cursor and printing output signals;

a display pointing control device including an arrow-shaped physical location pointer for pointing to physical locations;

said display pointing control device further includes a means for generating physical location signals corresponding to physical locations pointed by said physical location pointer;

said display pointing control device further includes a computer interface means for connecting to said computer for transmitting said physical location signals thereto;

said display pointing control device further includes a movement detection means having a first and a second rotation balls rigidly attached to and moving together with said physical location pointer for detecting a movement of said display pointing device for generating a display pointing device movement signal; and said computer further includes a means for interfacing with said display pointing control device for processing said physical location signals and said display point device movement signal from said computer interface means for controlling and moving said display cursor and for recording and correlating cursor locations corresponding to designated physical locations pointed by said physical location pointer thus generating said printing output signal at said designated physical locations.

8. A method for correlating a physical movement of a computer display pointing device to a display cursor movement controlled by said display pointing device, said method comprising steps of:

(a) providing an arrow-shaped physical location pointer to said computer display pointing device for pointing to physical locations;

(b) providing a means for generating physical location signals by containing two rotation balls therein and rigidly attaching said means for generating physical location signals to said physical location pointer for moving and rotating said two rotation balls together with said physical location pointer and useful for recording and correlating cursor locations corresponding to physical locations pointed by said physical location pointer; and (c) correlating said cursor locations with said physical locations.

9. A computer display pointing device for controlling a display cursor comprising:

a computer mouse with an arrow-shaped physical location pointer for pointing to physical locations;

a means for generating physical location signals useful for recording and correlating cursor locations corresponding to physical locations pointed by said physical location pointer;

said means for generating physical location signals containing a two-dimensional total-self-movement-measuring displacement-detecting means therein for moving together with said physical location pointer for measuring a two-dimensional displacement in generating said physical location signals correlating to a physical motion of said physical location pointer.

10. The computer display pointing device of claim 9 further comprising:

a switching means for switching said display point device between a regular cursor-control mode and a two-dimensional total-self-movement-measuring displacement-detecting mode.

11. A method for correlating a physical movement of a computer mouse display pointing device to a display cursor movement controlled by said display pointing device, said method comprising steps of:

(a) providing an arrow-shaped physical location pointer to said computer display pointing device for pointing to physical locations;

(b) providing a means for generating physical location signals by containing a two-dimensional total-self-movement-measuring displacement-detecting means in said pointing device for moving together with said physical location pointer for measuring a two-dimensional displacement in generating said physical location signals correlating to a physical motion of said physical location pointer; and (c) correlating said cursor locations with said physical locations.

* * * * *